(12) United States Patent
Lai et al.

(10) Patent No.: US 7,781,554 B2
(45) Date of Patent: Aug. 24, 2010

(54) POLYSILOXANES AND POLYSILOXANE PREPOLYMERS WITH VINYL OR EPOXY FUNCTIONALITY

(75) Inventors: Yu-Chin Lai, Pittsford, NY (US); Edmond T. Quinn, Rochester, NY (US); Weihong Lang, Amston, CT (US); Ivan M. Nunez, Penfield, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 238 days.

(21) Appl. No.: 12/042,378

(22) Filed: Mar. 5, 2008

(65) Prior Publication Data
US 2009/0227804 A1 Sep. 10, 2009

(51) Int. Cl.
*C08G 77/00* (2006.01)
(52) U.S. Cl. .................. 528/10; 523/106; 523/107; 523/108
(58) Field of Classification Search .............. 528/10
See application file for complete search history.

(56) References Cited

U.S. PATENT DOCUMENTS

| | | | |
|---|---|---|---|
| 4,413,104 A * | 11/1983 | Deubzer et al. .......... 525/479 |
| 4,711,943 A | 12/1987 | Harvey, III et al. | |
| 4,910,277 A | 3/1990 | Bambury et al. | |
| 5,034,461 A | 7/1991 | Lai et al. | |
| 5,070,215 A | 12/1991 | Bambury et al. | |
| 5,194,542 A * | 3/1993 | Iwamoto et al. .......... 526/246 |
| 5,652,014 A | 7/1997 | Galin et al. | |
| 6,218,503 B1 | 4/2001 | Lai et al. | |
| 6,630,243 B2 | 10/2003 | Valint, Jr. et al. | |
| 2004/0254326 A1 * | 12/2004 | Lai et al. .................. 528/43 |
| 2005/0085612 A1 | 4/2005 | Schafer et al. | |
| 2006/0142524 A1 | 6/2006 | Lai et al. | |
| 2006/0276608 A1 * | 12/2006 | Lang et al. .............. 528/25 |

FOREIGN PATENT DOCUMENTS

| | | |
|---|---|---|
| EP | 0770725 A2 | 6/1997 |
| JP | 04149235 | 5/1992 |
| JP | 06306143 | 11/1994 |
| WO | WO 2006/071387 A1 | 7/2006 |
| WO | WO 2006/071388 A1 | 7/2006 |

OTHER PUBLICATIONS

Makromol. Chem. 188, 93-102 (1987) Neumann et al, Surface Wettability of Silicone Rubber Films.*
Ragheb et al., "Synthesis and characterization of poly(lactide-b-siloxane-b-lactide) copolymers as magnetite nanoparticle dispersants," Chem Abstracts Acc. No. 1721, (Nov. 19, 2008).

* cited by examiner

*Primary Examiner*—Randy Gulakowski
*Assistant Examiner*—Lindsay Nelson
(74) *Attorney, Agent, or Firm*—Joseph Barrera

(57) ABSTRACT

Polysiloxanes having vinyl or epoxy functionality. The polysiloxanes are used to form polymer-based materials having properties particularly suited for biomedical device applications. The polysiloxanes are of general formula I:

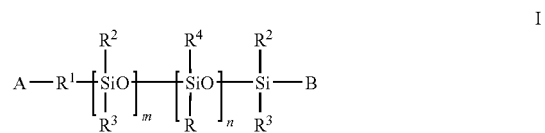

wherein
R is a $C_{2-10}$ alkenyl, a $C_{2-10}$ alkyl with an epoxy group or a $C_5$-$C_7$ cycloalkyl with an epoxy group;
$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;
A is —OH or —$NHR^5$, wherein $R^5$ is hydrogen or a $C_{1-3}$ alkyl; and
B is —$R^1$-A or —$R^6$, wherein $R^1$ is a linking group having an alkylene group with 2 to 8 carbon atoms wherein the alkylene group optionally includes ether, urethane or ureido linkages; and $R^6$ is selected from the group consisting of $C_{1-4}$ alkyl, optionally substituted phenyl or optionally substituted benzyl; and
m and n are integers with an m:n ratio from 30:1 to 3:1.

20 Claims, No Drawings

POLYSILOXANES AND POLYSILOXANE PREPOLYMERS WITH VINYL OR EPOXY FUNCTIONALITY

FIELD OF THE INVENTION

The invention is related to polysiloxanes and polysiloxane prepolymers having vinyl or epoxy functionality, and the use of such polysiloxanes and polysiloxane prepolymers to form polymeric materials for biomedical devices, particularly ophthalmic devices including contact lenses.

BACKGROUND OF THE INVENTION

Hydrogels represent a desirable class of materials for contact and intraocular lenses. The advantages of such materials can include relatively high oxygen permeability, biocompatibility and comfort. Hydrogels are a crosslinked polymer materials having a certain percentage of water. One class of hydrogel materials used for lenses can be prepared from monomeric mixtures containing hydrophilic monomers such as 2-hydroxyethyl methacrylate or N-vinyl pyrrolidone. The oxygen permeability of these hydrogel materials relates directly to the equilibrium water content of the materials.

A second class of hydrogel materials used for lenses can be prepared from monomeric mixtures containing one or more silicone-containing monomers and one or more hydrophilic monomers. In some cases, the silicone-containing monomer or the hydrophilic monomer can function as a crosslinking agent (a crosslinking agent being defined as a monomer having multiple polymerizable functionalities). Alternatively, a separate crosslinking agent can be added to monomer mixture. Silicone hydrogels typically have a water content between 10 to 80 weight percent. These silicon-hydrogel materials typically will have a higher oxygen permeability than a similar HEMA-based hydrogel.

U.S. Pat. No. 5,034,461 discloses various polysiloxane prepolymers with urethane or urea linkages. Generally, these prepolymers are derived from a short chain diol, a hydroxy-terminated polydimethylsiloxane and a diisocyanate such that the structures resemble a segmented polyurethane elastomer. The polysiloxane prepolymers are then endcapped with polymerizable ethylenically unsaturated radical such as HEMA reacted with isocyanate. The polysiloxane prepolymers can be copolymerized with a hydrophilic monomer to form a silicone hydrogel copolymer that is useful as a contact lens material or other biomedical device applications.

The polysiloxane prepolymers described in U.S. patent application Ser. No. 11/292,817, filed Dec. 2, 2005 comprise soft and strong hard segments as in U.S. Pat. No. 5,034,461, however, the prepolymers further include relatively weaker hard or medium hard segments. The addition of the medium hard segments can provide several material advantages. First, the later prepolymers tend to have a lower viscosity at room temperature, which can allow for easier processing during synthesis and in casting of biomedical devices. Second, the later prepolymers can provide a material with a higher silicone content, thereby resulting in a material with higher oxygen permeability yet maintaining good compatibility with hydrophilic monomer and forming clear hydrogels.

Regardless of their water content, many silicone hydrogel materials tend to have relatively hydrophobic, non-wettable surfaces. Those skilled in the art have recognized the need to increase the hydrophilic nature of the surface of these materials, in particular, for materials used for contact lenses. Increasing the hydrophilicity of the contact-lens surface improves the wettability of the contact lenses with tear fluid in the eye. This in turn improves the wear comfort of the contact lenses. In the case of continuous-wear lenses, the surface properties of the material are especially important. The surface of a continuous-wear lens must be designed, not only for comfort, but to avoid adverse reactions such as corneal edema, inflammation, or lymphocyte infiltration.

One known method to increase the hydrophilicity of the silicon hydrogel surface is with a plasma treatment as described in U.S. Pat. No. 6,630,243. This patent describes a method to provide a carbonaceous layer with a plasma treatment followed by attachment of hydrophilic polymer chains to the carbon layer. Alternatively, hydrophilic or otherwise biocompatible polymeric chains can be attached to a surface of an ophthalmic lens by chemical modification of the surface. For example, U.S. Pat. No. 5,652,014 describes amination of a substrate followed by reaction with hydrophilic polymers such as a PEO star molecule or a sulfated polysaccharide.

The use of siloxane prepolymers for the fabrication of optical lenses is well known due to the relatively high oxygen permeability and softness of the resulting three-dimensional lens materials.

SUMMARY OF THE INVENTION

The invention is directed to polysiloxanes having vinyl or epoxy functionality. The polysiloxanes are used to form polymeric materials having properties particularly suited for biomedical device applications. Accordingly, the invention is directed to a polysiloxane of general formula I:

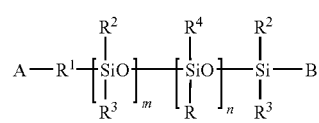

wherein

R is a $C_{2-10}$ alkenyl, a $C_{2-10}$ alkyl with an epoxy group or a $C_5$-$C_7$ cycloalkyl with an epoxy group;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

A is —OH or —NHR$^5$, wherein $R^5$ is hydrogen or a $C_{1-3}$ alkyl;

B is —R$^1$-A or —R$^6$, wherein $R^1$ is a linking group having an alkylene group with 2 to 8 carbon atoms wherein the alkylene group optionally includes ether, urethane or ureido linkages; and $R^6$ is selected from the group consisting of $C_{1-4}$ alkyl, optionally substituted phenyl and optionally substituted benzyl; and m and n are integers with an m:n ratio from 30:1 to 3:1.

The invention is also directed to a silicone prepolymer of general formula II

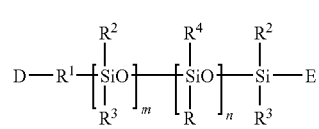

wherein

R is a $C_{2-10}$ alkyl with an epoxy group or a $C_5$-$C_7$ cycloalkyl with an epoxy group;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

m and n are integers with an m:n ratio from 30:1 to 3:1;

$R^1$ is an alkylene group with 2 to 8 carbon atoms wherein the alkylene group optionally includes ether, urethane or ureido linkages;

D is defined by -U-L-M, wherein U is a urethane or urea link, L is an alkylene group with 2 to 8 carbon atoms wherein the alkylene group optionally includes ether, urethane or ureido linkages, and M is an activated polymerizable group; and E is defined by —$R^1$-D or —$R^6$, wherein $R^6$ is selected from the group consisting of $C_{1-4}$ alkyl, optionally substituted phenyl or optionally substituted benzyl.

The invention is also directed to a silicone prepolymer of general formula III

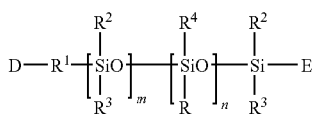

wherein

R is a $C_{2-10}$ alkenyl;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

m and n are integers with an m:n ratio from 30:1 to 3:1;

$R^1$ is an alkylene group with 2 to 8 carbon atoms wherein the alkylene group optionally includes ether, urethane or ureido linkages;

D is defined by -U-L-M, wherein U is a urethane or urea link, L is an alkylene group with 2 to 8 carbon atoms wherein the alkylene group optionally includes ether, urethane or ureido linkages, and M is an activated polymerizable group; and E is defined by —$R^1$-D or —$R^6$, wherein $R^6$ is selected from the group consisting of $C_{1-4}$ alkyl, optionally substituted phenyl or optionally substituted benzyl.

The invention is also directed to a polysiloxane prepolymer comprising siloxane segments (HS) and (MH)

wherein:

each Dii is independently a diradical residue of a diisocyanate;

each Diol is independently a diradical residue of a diol having 1 to 10 carbon atoms;

each * is independently —NHC(O)NH—, —NHC(O)O— or —OC(O)NH—;

x represents the number of segments (HS) and is at least 2;

y represents the number of segments (MH) and is at least 1; and each PS is independently a diradical residue of a polysiloxane of formula

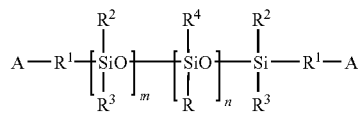

wherein

R is a $C_{2-10}$ alkenyl, a $C_{2-10}$ alkyl with an epoxy group or a $C_5$-$C_7$ cycloalkyl with an epoxy group;

$R^1$ is a linking group having an alkylene group with 2 to 8 carbon atoms wherein the alkylene group optionally includes ether, urethane or ureido linkages;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

A is —OH or —$NHR^5$, wherein $R^5$ is hydrogen or a $C_{1-3}$ alkyl; and m and n are integers with an m:n ratio from 30:1 to 3:1.

DETAILED DESCRIPTION OF THE INVENTION

The invention is directed to polysiloxanes having vinyl groups or epoxy groups, and the use of such polysiloxanes to prepare polysiloxane prepolymers, which can then be used to prepare polymeric silicone materials for biomedical devices. The vinyl groups or epoxy groups are positioned at a plurality of siloxane units along the length of the polysiloxane, and thereby provide a plurality of reactive sites on the surface of polymeric silicone materials.

As used herein, a "biomedical device" is any article that is designed to be used in contact with mammalian tissues or fluid, and preferably with human tissue or fluids. Examples of these devices include but are not limited to catheters, implants, stents, and ophthalmic devices. As used herein, the terms "lens" and "ophthalmic device" refer to devices that reside in or on the eye. These devices can provide optical correction, wound care, drug delivery, diagnostic functionality, cosmetic enhancement or effect or a combination of these properties. The term lens includes but is not limited to soft contact lenses, hard contact lenses, intraocular lenses, overlay lenses, ocular inserts, and optical inserts.

Accordingly, the invention is directed to polysiloxanes having a vinyl group or epoxy group of general formula I

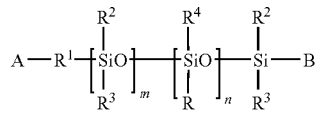

R is a $C_{2-10}$ alkenyl, a $C_{2-10}$ alkyl with an epoxy group or a $C_5$-$C_7$ cycloalkyl with an epoxy group;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

A is —OH or —$NHR^5$, wherein $R^5$ is hydrogen or a $C_{1-3}$ alkyl;

B is —$R^1$-A or —$R^6$, wherein $R^1$ is a linking group having an alkylene group with 2 to 8 carbon atoms wherein the alkylene group optionally includes ether, urethane or ureido linkages; and $R^6$ is selected from the group consisting of $C_{1-4}$ alkyl, optionally substituted phenyl and optionally substituted benzyl; and m and n are integers with an m:n ratio from 30:1 to 3:1.

The polysiloxanes of general formula I can have one or more vinyl groups or one or more epoxy groups for each of R, however, most embodiments of general formula I will have one vinyl group or one epoxy group for each of R.

In most instances, the m:n ratio is from 24:1 to 8:1, and the polysiloxanes will have an average number molecular weight of 1000 to 20,000 and more typically an average number molecular weight of 3000 to 10,000 It is understood by those of ordinary skill in the art, that the siloxane units $(R^2R^3SiO)_m$ and $(R^4RSiO)_n$ are randomly distributed along the polysiloxane chain.

In one embodiment, the reactive vinyl groups can be used as points of attachment for various reactive organic radicals with at least one functional group. For example, the plurality of vinyl groups can be reacted with an epoxide forming agent, e.g., an organic peroxide, to form corresponding epoxide groups along the length of a polysiloxane of general formula I. The resulting poly(epoxy)siloxane can then be converted into a silicone prepolymer of general formula II, which is then used to form a polymeric, silicone biomedical device according to well known methods. The resulting plurality of epoxy sites on or near their surface of the biomedical device is then used to further modify the surface of the device.

Accordingly, the invention is also directed to a silicone prepolymer of general formula II

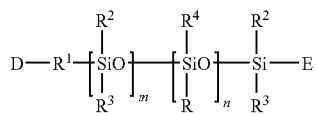

wherein

R is a $C_{2-10}$ alkyl having at least one epoxy group or a $C_5$-$C_7$ cycloalkyl having at least one epoxy group;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

m and n are integers with an m:n ratio from 30:1 to 3:1;

$R^1$ is an alkylene group with 2 to 8 carbon atoms wherein the alkylene group optionally includes ether, urethane or ureido linkages;

D is defined by -U-L-M, wherein U is a urethane or urea link, L is an alkylene group with 2 to 8 carbon atoms wherein the alkylene group optionally includes ether, urethane or ureido linkages, and M is an activated polymerizable group; and E is defined by —$R^1$-D or —$R^6$, wherein $R^6$ is selected from the group consisting of $C_{1-4}$ alkyl, optionally substituted phenyl and optionally substituted benzyl.

In another embodiment, the poly(vinyl)siloxanes of general formula I can be used to prepare a silicone prepolymer of general formula III having a plurality of vinyl groups tethered along the siloxane backbone of the prepolymer.

Accordingly, the invention is also directed to a silicone prepolymer of general formula III

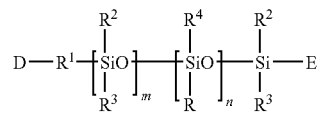

wherein

R is a $C_{2-10}$ alkenyl;

$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

m and n are integers with an m:n ratio from 30:1 to 3:1;

$R^1$ is an alkylene group with 2 to 8 carbon atoms wherein the alkylene group optionally includes ether, urethane or ureido linkages;

D is defined by -U-L-M, wherein U is a urethane or urea link, L is an alkylene group with 2 to 8 carbon atoms wherein the alkylene group optionally includes ether, urethane or ureido linkages, and M is an activated polymerizable group; and E is defined by —$R^1$-D or —$R^6$, wherein $R^6$ is selected from the group consisting of $C_{1-4}$ alkyl, optionally substituted phenyl and optionally substituted benzyl.

The silicone prepolymer of general formula III can be an intermediate prepolymer to the preparation of silicone prepolymer of general formula II. Alternatively, the reactive vinyl groups tethered along the siloxane units can be used as reactive sites for other functional group modification, e.g., the conversion to hydroxyl or acidic groups.

In many embodiments of the polysiloxanes of general formula I and the polysiloxane prepolymers of general formula II and general formula III, $R^1$ is independently represented by formula S or formula T,

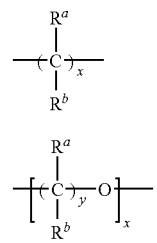

wherein x is any integer from 1 to 6, y is any integer from 2 to 6, and $R^a$ and $R^b$ are each independently selected from hydrogen, fluorine or methyl. In still other embodiments, $R^1$ is represented by formula S, x is 3 or 4 and $R^2$, $R^3$ and $R^4$ are independently selected from methyl, ethyl or phenyl. Especially preferred $R^1$ radicals are fluoro alkylenes with ether linkages such as —$CH_2CH_2CH_2OCH_2(CF_2)_z$- where z is 1 to 6.

In either case, the presence of vinyl or epoxy groups on or near their surface of a biomedical device provides a relatively facile path for modifying the surface of the device material.

Biomedical devices, e.g., a silicon hydrogel contact lens, are fabricated from a polymerization lens composition comprising one or more silicone prepolymers of general formula II or general formula III and one or more hydrophilic polymers, and optionally a crosslinking agent and additional silicone monomer. The polymerization composition is injected into the lens mold and the polymerization initiated by thermal or by photochemical conditions. Once formed the resulting polymeric lens material is separated from the mold by contacting the lens with one or more fluids. The fluids can include a wash fluid, for example, to remove portions of unreacted monomer or prepolymer. Alternatively, the fluid can be water to initially hydrate the lens material. The resulting expansion of the lens material typically provides sufficient forces to separate the lens from the mold. Following separation of the lens material with water, the lens is contacted with a wash fluid to remove any unreacted monomer or prepolymer.

In another embodiment, the reactive vinyl sites tethered along the siloxane backbone can be used as points to attach any number of organic compounds that modify the chemical or physical properties of the polysiloxane as well as the resulting silicone prepolymer. For example, one can use the vinyl sites of a silicone prepolymer of general formula III as crosslinking sites in which to form a polymeric lens material. Alternatively, the reactive vinyl sites on a silicone lens material can be used to attach one or more coating polymers to the surface of the biomedical device. For example, one can use the vinyl sites as point to graft hydrophilic polymers to the surface of the biomedical device.

Preferably, the alkenyl group will contain from two to four carbons or be a cyclic alkene with six to eight carbons. Exemplary alkenyl groups being selected from the group consisting of —CH=CH$_2$, —CH$_2$—CH=CH$_2$, —CH$_2$—CH$_2$—CH=CH$_2$ and the cyclic alkenes —CH$_2$—C$_5$H$_7$ and —CH$_2$—C$_6$H$_9$.

The polysiloxane of general formula I will have a plurality of epoxy groups having two to ten carbon atoms randomly tethered along the polysiloxane backbone. Preferably, the epoxy groups will contain from two to four carbons. Exemplary epoxy groups being selected from the group consisting of

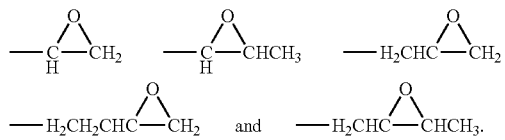

In one embodiment, the polysiloxane linker ($R^1$) will be an alkylene as represented by formula S. Preferably, x is 3, 4, 5 or 6 and $R^a$ and $R^b$ are both hydrogen.

The polysiloxane of general formula I can be monofunctional (B is —$R^6$) or difunctional (B is —$R^1$-A) capable of reacting with a prepolymer polymerizing agent such as an isocyanate. In this regard, one or both of the terminating ends of the polysiloxane of formula I will include a hydroxyl, that is, A is —OH, or an amine, that is A is —NHR$^4$.

The polysiloxane can have one or two terminating ends capable of reacting with a prepolymer polymerizing agent having an activated unsaturated group. In this regard, one or both of the terminating ends of polysiloxane of formula IV will include a hydroxyl, that is, A is —OH, or an amine, that is A is —NHR$^4$.

In one embodiment, the polysiloxane prepolymer will comprises siloxane segments (HS) and (MH):

(*Dii*Diol*Dii*PS)$_x$ (HS)

(*Dii*PS)$_y$ (MH)

wherein:
each Dii is independently a diradical residue of a diisocyanate;
each Diol is independently a diradical residue of a diol having 1 to 10 carbon atoms;

each PS is independently a diradical residue of a polysiloxane of general formula I as defined above;
each * is independently —NHC(O)NH—, —NHC(O)O— or —OC(O)NH—:
x represents the number of blocks (HS) and is at least 2, and
y represents the number of blocks (MH) and is at least 1.

The s segments HS and MH of the above prepolymers include the residue of a diol represented as "Diol". Some of the more preferred Diol radicals include the diradical residue of an alkyl diol, a cycloalkyl diol, an alkyl cycloalkyl diol, an aryl diol or an alkylaryl diol having 1 to 10 carbon atoms and which may contain ether, thio or amine linkages in the main chain. Representative diols include 2,2-(4,4'-dihydroxydiphenyl)propane(bisphenol-A), 4,4'-iso-propylidine dicyclohexanol, ethoxylated and propoxylated bisphenol-A, 2,2-(4,4'-dihydroxydiphenyl)pentane, 1,1'-(4,4'-dihydroxydiphenyl)-p-diisopropyl benzene, 1,3-cyclohexane diol, 1,4-cyclohexane diol, 1-4-cyclohexane dimethanol, neopentyl glycol, 1,4-butanediol, 1,3-propanediol, 1,5-pentanediol, ethylene glycol, diethylene glycol and triethylene glycol. Especially preferred are alkylene and etherified alkylene diols having 1 to 10 carbon atoms.

The aforementioned HS and MH segments and diol residue segments are linked via diisocyanates that react with hydroxyl- or amino-functionality of the polysiloxane-containing segments and diols. Generally, any diisocyanate may be employed. These diisocyanates may be aliphatic or aromatic, and include alkyl, alkyl cycloalkyl, cycloalkyl, alkyl aromatic and aromatic diisocyanates preferably having 6 to 30 carbon atoms in the aliphatic or aromatic moiety. Specific examples include isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl)cyclohexane, and cyclohexane diisocyanate.

Generally, higher x values results in prepolymers have a higher number of polar urethane/urea linkages, and polarity of the prepolymer is important to ensure compatibility with hydrophilic co-monomers. Generally, higher y values results in prepolymers with a higher percentage of silicon, resulting in higher oxygen permeability. However, the ratio of x and y should be balanced. Accordingly, the ratio of x to y is preferably at least 0.6 (i.e., x:y is at least 0.6:1), more preferably at least 0.75.

Any one or more of known silicon-containing monomers can be combined with the described polysiloxanes of general formula II or general formula III and one or more hydrophilic monomers to form a polymerization composition that is then polymerized to provide a silicon hydrogel material.

As already mentioned, the silicon hydrogel will likely include one or more silicon monomers in addition to the polysiloxane prepolymers of general formula II and general formula III. The silicone monomers that can be used include those of Structure A.

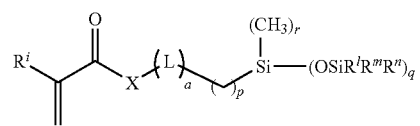

wherein $R^i$ is H or CH$_3$, q is 1 or 2 and for each q, $R^l$, $R^m$ and $R^n$ are independently selected from ethyl, methyl, benzyl, phenyl or a monovalent siloxane chain comprising from 1 to 30 repeating Si—O units, p is an integer from 1 to 10, r=(3-q), X is O, NH or N(C$_{1-4}$alkyl), a is 0 or 1, and L is a divalent linking group which preferably comprises from 2 to 5 carbons, which may also optionally comprise ether or hydroxyl groups, for example, a poly(ethylene glycol) chain.

Examples of the silicone-containing monomers of Structure A that can be used are (3-methacryloyloxypropyl)bis(trimethylsiloxy)methylsilane, (3-methacryloyloxypropyl)-pentamethyldisiloxane, (3-methacryloyloxy-2-hydroxypropyloxy)bis(trimethylsiloxy)methylsilane. Preferred silicone-containing monomers are monomethacryloyloxyalkyl-terminated polydimethylsiloxanes ("mPDMS"), such as those shown in structure B.

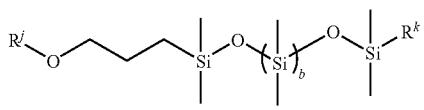

B where b=0 to 100, and R$^k$ is any C$_{1-10}$ aliphatic or aromatic group which can include hetero atoms; provided that R$^k$ is not functionalized at the point at which it is bonded to Si. Preferably, R$^k$ is a C$_{3-8}$ alkyl groups with butyl groups, particularly sec-butyl groups, being most preferred. R$^j$ is an ethylenically unsaturated moiety; preferably a single polymerizable vinyl group. More preferably, R$^j$ is a methacryl moiety but it can also be an acryl or styrenic moiety or other similar moiety.

Other silicon-containing monomers that can be used include (3-methacryloxypropyl)tris(trimethylsiloxy)silane (TRIS), amide analogs of TRIS described in U.S. Pat. No. 4,711,943, and the vinylcarbamate or carbonate analogs described in U.S. Pat. No. 5,070,215.

Examples of some other silicon-containing monomers include bulky polysiloxanylalkyl(meth)acrylic monomers. An example of bulky polysiloxanylalkyl(meth)acrylic monomers are represented by Structure C:

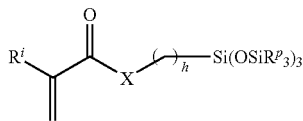

C wherein X denotes O or NR$^i$; h is an integer from 1 to 10;
each R$^i$ independently denotes hydrogen or methyl; and each R$^p$ independently denotes a lower alkyl radical or phenyl radical.

Another class of representative silicon-containing monomers includes silicone-containing vinyl carbonate or vinyl carbamate monomers such as:

1,3-bis[4-vinyloxycarbonyloxy)but-1-yl]tetramethyldisiloxane;
1,3-bis[4-vinyloxycarbonyloxy)but-1-yl]polydimethylsiloxane;
3-(trimethylsilyl)propyl vinyl carbonate;
3-(vinyloxycarbonylthio)propyl-[tris(trimethylsiloxy)silane];
3-[tris(trimethylsiloxy)silyl]propyl vinyl carbamate;
3-[tris(trimethylsiloxy)silyl]propyl allyl carbamate;
3-[tris(trimethylsiloxy)silyl]propyl vinyl carbonate;
t-butyldimethylsiloxyethyl vinyl carbonate;
trimethylsilylethyl vinyl carbonate; and trimethylsilylmethyl vinyl carbonate.

Examples of silicon-containing vinyl carbonate or vinyl carbamate monomers are represented by Structure D:

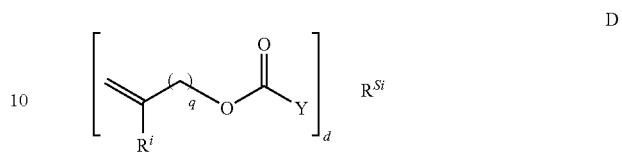

D wherein:
Y denotes O, S or NH;
R$^{Si}$ denotes a silicone-containing organic radical;
R$^i$ denotes hydrogen or methyl;
d is 1, 2, 3 or 4; and q is 0 or 1.
Suitable silicone-containing organic radicals RSi include the following:
—(CH$_2$)$_n$Si[(CH$_2$)$_m$CH$_3$]$_3$; —(CH$_2$)$_n$Si[OSi(CH$_2$)$_m$CH$_3$]$_3$; —(CH$_2$)$_n$Si[OSi(R')$_3$]$_3$
—(CH$_2$)$_n$[Si(R')$_2$O]$_e$Si(R')$_3$; and —(CH$_2$)$_n$[Si(R')$_2$O]$_e$M, wherein: M is represented by

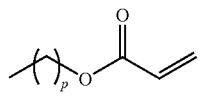

wherein p is 1 to 6;
R$^r$ denotes an alkyl radical or a fluoroalkyl radical having 1 to 6 carbon atoms;
e is an integer from 1 to 200; n is 1, 2, 3 or 4; and m is 0, 1, 2, 3, 4 or 5.
An example of a particular species within Structure D is represented by Structure E.

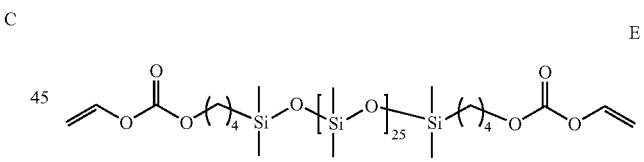

E

Another class of silicon-containing monomers includes polyurethane-polysiloxane macromonomers (also sometimes referred to as prepolymers), which may have hard-soft-hard blocks like traditional urethane elastomers. Examples of silicone urethane monomers are represented by general Formulae IV and V:

E(*D*A*D*G)$_a$*D*A*D*E'; or

E(*D*G*D*A)$_a$*D*G*D*E';

wherein:
D denotes an alkyl diradical, an alkyl cycloalkyl diradical, a cycloalkyl diradical, an aryl diradical or an alkylaryl diradical having 6 to 30 carbon atoms;
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

denotes a urethane or ureido linkage;

a is at least 1;

A denotes a divalent polymeric radical of Structure F:

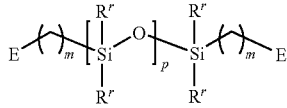

F wherein:

each $R^r$ independently denotes an alkyl or fluoro-substituted alkyl group having 1 to 6 carbon atoms which may contain ether linkages between carbon atoms;

m is at least 1; and p is a number which provides a moiety weight of 400 to 10,000;

E denotes a polymerizable unsaturated organic radical represented by Structure G:

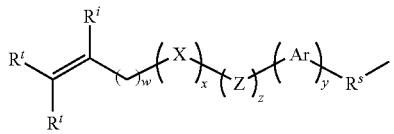

G wherein:

$R^i$ is hydrogen or methyl;

$R^t$ is hydrogen, an alkyl radical having 1 to 6 carbon atoms, or a —CO—Y—$R^u$ radical wherein Y is O, S or NH;

$R^s$ is a divalent alkylene radical having 1 to 10 carbon atoms;

$R^u$ is a alkyl radical having 1 to 12 carbon atoms;

X denotes CO or OCO;

Z denotes O or NH;

Ar denotes an aromatic radical having 6 to 30 carbon atoms;

w is an integer from 0 to 6; x is 0 or 1; y is 0 or 1; and z is 0 or 1.

An example of another silicon-containing monomer that can be combined with a silicone/epoxy-containing monomer are shown by Structure J

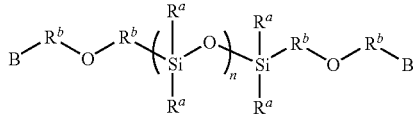

J wherein B is represented by

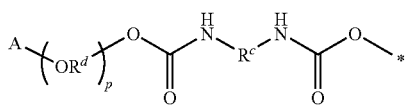

and A is represented by

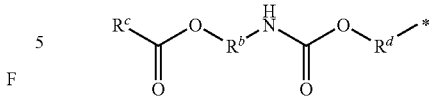

and wherein: $R^a$ independently denote a $C_1$-$C_6$ alkyl; $R^b$ independently denotes a $C_1$-$C_6$ alkylene; $R^c$ independently denote a linear or branched alkylene; $R^d$ independently denote a $C_1$-$C_2$ alkylene; $R^e$ independently denotes a $C_1$-$C_6$ alkylene; m and p are integers independently selected form the integers from 3 to 44; and n is an integer from 13 to 80, and the silicon-containing monomer has a number-average molecular weight of 2000 to 10,000.

The silicone hydrogels following hydration will typically comprise from 10 to 60 wt % water, or 25 to 50 wt % water, based on the total weight of the silicone hydrogel.

The silicon hydrogel materials can also be characterized as having low haze, good wettability and modulus. Haze is measured by placing test lenses in saline in a clear cell above a black background, illuminating from below with a fiber optic lamp at an angle 66° normal to the lens cell, and capturing an image of the lens from above with a video camera. The background-subtracted scattered light image is quantitatively analyzed, by integrating over the central 10 mm of the lens, and then compared to a −1.00 diopter CSI Thin Lens®, which is arbitrarily set at a haze value of 100, with no lens set as a haze value of 0.

Wettability is measured by measuring the dynamic contact angle or DCA at 23° C. with borate buffered saline. The wetting force between the lens surface and borate buffered saline is measured using a Wilhelmy microbalance while the sample is being immersed into or pulled out of the saline. The following equation is used $F = 2\gamma\rho \cos \theta$ where F is the wetting force, $\gamma$ is the surface tension of the probe liquid, $\rho$ is the perimeter of the sample at the meniscus and $\theta$ is the contact angle. Typically, two contact angles are obtained from a dynamic wetting experiment, i.e., the advancing contact angle and the receding contact angle. The advancing contact angle is obtained from the portion of the wetting experiment where the sample is being immersed into the test liquid.

The silicon hydrogel materials have a modulus of at least about 30 psi, preferably from 30 psi to 110 psi, or between 40 psi and 70 psi. Modulus is measured by using the crosshead of a constant rate of movement type tensile testing machine equipped with a load cell that is lowered to the initial gauge height. A suitable testing machine includes an Instron model 1122. A dog-bone shaped sample having a 0.522 inch length, 0.276 inch "ear" width and 0.213 inch "neck" width is loaded into the grips and elongated at a constant rate of strain of 2 in/min. until it breaks. The initial gauge length of the sample (Lo) and sample length at break (Lf) are measured. Twelve specimens of each composition are measured and the average is reported. Tensile modulus is measured at the initial linear portion of the stress/strain curve.

The silicon hydrogel materials have O2 Dk values between 40 barrer and 300 barrer, determined by the polarographic method. Lenses are positioned on the sensor then covered on the upper side with a mesh support. The lens is exposed to an atmosphere of humidified 21 wt % oxygen. The oxygen that diffuses through the lens is measured using a polarographic oxygen sensor consisting of a 4 mm diameter gold cathode and a silver ring anode. The reference values are Balafilcon A lenses (Bausch & Lomb) which have a Dk value of about 90 barrer.

As stated, the silicon hydrogels are likely to include monomeric units of one or more hydrophilic monomers. The hydrophilic monomers are added to the silicon hydrogel formulation which also includes one or more silicone monomers and one or more amino monomers. The hydrophilic monomers can be any of the known monomers used in the prior art to make silicone hydrogels. The preferred hydrophilic monomers may be either acrylic- or vinyl-containing. Such hydrophilic monomers may themselves be used as crosslinking agents. The term "vinyl-type" or "vinyl-containing" monomers refers to monomers containing the vinyl grouping (—CH=CH2) and are generally highly reactive. Such hydrophilic vinyl-containing monomers are known to polymerize relatively easily. Hydrophilic vinyl-containing monomers which may be incorporated into the hydrogels of the present invention include monomers such as N-vinyl lactams (e.g. N-vinyl pyrrolidone (NVP)), N-vinyl-N-methyl acetamide, N-vinyl-N-ethyl acetamide, N-vinyl-N-ethyl formamide, and N-vinyl formamide. NVP is one of the more preferred hydrophilic monomers. Examples of (meth)acrylic-type monomers that can be used include N,N-dimethyl acrylamide (DMA), 2-hydroxyethyl methacrylate (HEMA), glycerol methacrylate, 2-hydroxyethyl methacrylamide, polyethyleneglycol monomethacrylate, methacrylic acid and acrylic acid.

Other hydrophilic monomers that can be used include polyoxyethylene polyols having one or more of the terminal hydroxyl groups replaced with a functional group containing a polymerizable double bond. Examples include polyethylene glycol, ethoxylated alkyl glucoside, and ethoxylated bisphenol A reacted with one or more molar equivalents of an end-capping group such as isocyanatoethyl methacrylate ("IEM"), methacrylic anhydride, methacryloyl chloride, vinylbenzoyl chloride, or the like, to produce a polyethylene polyol having one or more terminal polymerizable olefinic groups bonded to the polyethylene polyol through linking moieties such as carbamate or ester groups.

Still further examples are the hydrophilic vinyl carbonate or vinyl carbamate monomers disclosed in U.S. Pat. No. 5,070,215, incorporated herein by reference, and the hydrophilic oxazolone anonomers disclosed in U.S. Pat. No. 4,910,277, incorporated herein by reference. Other suitable hydrophilic monomers will be apparent to one skilled in the art.

An exemplary list of hydrophilic monomers used to prepare silicone hydrogel materials include N,N-dimethyl acrylamide (DMA), 2-hydroxyethyl methacrylate (HEMA), glycerol methacrylate, 2-hydroxyethyl methacrylamide, N-vinylpyrrolidone (NVP), polyethyleneglycol monomethacrylate, methacrylic acid and acrylic acid. The more preferred hydrophilic monomers are selected from the group consisting of DMA, HEMA and NVP. DMA is the most preferred.

An additional class of contact lens materials are rigid copolymers, especially rigid, gas-permeable (RGP) copolymers. RGP copolymers generally include: a silicone-containing monomer, including any of the aforementioned silicone-containing monomers mentioned above; a hydrophilic monomer as a wetting agent; a hardness modifying monomer; and a crosslinking agent; a polymerization initiator; an ultraviolet blocking agent; or a colorant.

EXAMPLE 1A

Preparation of bis($\alpha,\omega$-hydoxybutyl)poly(dimethylsiloxane-co-methylvinylsiloxane) with 10% vinylmethylsiloxane units A 3 L round bottom flask equipped with mechanical stirrer was charged with 1,3-bis-hydroxybutyltetramethyldisiloxane (BHBTMDS, 33.11 g, 0.119 mole), dimethoxydimethylsilane (855.32 g, 6.9 moles) and dimethoxymethylvinylsilane (113.6 g, 0.833 mole). Distilled water (139 mL) and concentrated HCl (12 mL) were added to an addition funnel and the acidic solution was added to the silane/siloxane reaction mixture over five minutes at room temperature. The reaction mixture was refluxed for 60 minutes. The methanol produced during the reaction was distilled from the reaction flask. A total of 466 g or 589 mL of methanol was collected.

An aqueous solution prepared with concentrated HCl (294 mL) and distilled water (294 mL) was added to the resulting reaction mixture at 60° C. over a period of 5 min, and the reaction mixture was heated to refluxed overnight (about 14 hrs). The contents of the reaction flask were extracted with 1×500 mL of diethyl ether. The ether extracts were washed with 1×500 mL of water, with 2×500 mL of 5% NaHCO3 (aq) solution, and lastly, with 500 mL of water. The ether solution was dried with sodium sulfate. The ether was removed in vacuo providing a crude reaction product (562 g). The crude reaction product was extracted with a mixture of 125 mL of water and 550 mL of methanol. Ether (500 mL) was again used to dissolve the product solids. The resulting ether solution was filtered and dried with magnesium sulfate. The ether was removed in vacuo and the final product was held under vacuum (0.1 mmHg) at 80-90° C. for 2 hrs.

EXAMPLE 1B

Preparation of bis($\alpha,\omega$-hydoxybutyl)poly(dimethylsiloxane-co methylvinylsiloxane) with 10% vinylmethylsiloxane Units)

The same procedure as described in Example 1A was used with the exception of charging BHBTMDS (28.67 g, 0.103 mole), dimethoxydimethylsilane (574 g, 4.63 mole) and dimethoxymethylvinylsilane (70.23 g, 0.53 moler) to the 3 L round bottom reaction flask.

EXAMPLE 1C

Preparation of bis($\alpha,\omega$-hydoxybutyl)poly(dimethylsiloxane-co methylvinylsiloxane) with 10% vinylmethylsiloxane Units)

The same procedure as described in Example 1A was used with the exception of charging BHBTMDS (30.68 g), dimethoxydimethylsilane (532.64 g) and dimethoxymethylvinylsilane (75.11 g) to the 3 L round bottom reaction flask.

EXAMPLE 2A

Preparation of bis(α,ω-hydoxybutyl)poly(dimethyl-siloxane-co methylvinylsiloxane) with 5% vinylmethylsiloxane Units)

The same procedure as described in Example 1A was used with the exception of charging BHBTMDS (37.81 g), dimethoxydimethylsilane (723.59 g) and dimethoxymethylvinylsilane (44.73 g) to the 3 L round bottom reaction flask. Also, distilled water (110 mL) and concentrated HCl (13 mL) were added to an addition funnel and the acidic solution added to the silane/siloxane reaction mixture over five minutes at room temperature.

EXAMPLE 2B

Preparation of bis(α,ω-hydoxybutyl)poly(dimethyl-siloxane-co methylvinylsiloxane) with 5% vinylmethylsiloxane Units)

The same procedure as described in Example 1A was used with the exception of charging BHBTMDS (46.13 g, 0.166 mole), dimethoxydimethylsilane (882.87 g, 7.12 mole) and dimethoxymethylvinylsilane (54.04 g, 0.396 mole) to the 3 L round bottom reaction flask. Also, distilled water (134 mL) and concentrated HCl (16.5 mL) were added to an addition funnel and the acidic solution added to the silane/siloxane reaction mixture over five minutes at room temperature. 483 g of purified product was obtained.

EXAMPLE 3A

Preparation of bis(α,ω-hydoxybutyl)poly(dimethyl-siloxane-co epoxymethylsiloxane) with 10% epoxymethylsiloxane Units)

A 1 L round bottom flask equipped with a mechanical stirrer was charged with 133.88 g of Example 1 [bis-α,ω-hydroxybutyl)poly(dimethylsiloxane-co methylvinylsiloxane)], 47.0 g of m-chloro perbenzoic acid and 200 mL of dichloromethane. The reaction contents were stirred continuously at room temperature. A small sample of the reaction mixture was removed periodically and an IR spectrum was obtained to monitor the progress of the oxidation reaction. After 3 days the reaction mixture still showed unreacted vinyl groups. The reaction mixture was filtered and the solvent was removed in vacuo. Diethyl ether, 200 mL, and 100 mL of 2 N NaOH was added to the resulting solids and allowed to stir for about 30 minutes. The resulting basic aqueous/ether solution was extracted with 1×100 mL of 2N HCl, 2×100 mL of distilled water, 1×100 mL of 5% NaHCO3, followed by 1×100 mL of distilled water. The pH of the resulting aqueous wash was about pH 7.0. The separated organic layer was dried with magnesium sulfate and the ether removed under vacuum at 80° C. for 2 hrs. Solid crystal was found present on the wall of the glass. The crystalline product was removed from flask.

H-NMR (ppm): 0.05 ppm (436 H), 0.55 ppm (4H), 1.36 ppm (4H), 1.55 ppm (6H), 2.09 ppm (7H), 2.62 ppm (7H), 2.84 ppm (7H), 3.62 ppm (4H), 5.79 ppm (0.9H), 5.96 ppm (1.8H). The H-NMR spectrum suggested that the epoxidation was about 90% complete, and there was 10% remaining vinyl groups, the polysiloxane had approximately 67 repeating units of dimethylsiloxane, 7 repeating units of methlyepoxy siloxane and 0.9 repeating units of methylvinylsiloxane. The theoretical Mn is about 5,962.

EXAMPLE 3B

Preparation of bis(α,ω-hydoxybutyl)poly(dimethyl-siloxane-co epoxymethylsiloxane) with 10% epoxymethylsiloxane Units)

The same procedure as described in Example 3A was used with the exception of using 143.9 g of the vinylsiloxane of Example 1B.

EXAMPLE 3C

Preparation of bis(α,ω-hydoxybutyl)poly(dimethyl-siloxane-co epoxymethylsiloxane) with 10% epoxymethylsiloxane Units)

The same procedure as described in Example 3A was used with the exception of using 156.2 g of the vinylsiloxane of Example 1B, 59.1 g of m-chloroperbenzoic acid and 250 mL of methylene chloride.

EXAMPLE 3D

Preparation of bis(α,ω-hydoxybutyl)poly(dimethyl-siloxane-co epoxymethylsiloxane) with 10% epoxymethylsiloxane Units)

The same procedure as described in Example 3A was used with the exception of using 285.8 g of the vinylsiloxane of Example 1C, 102.5 g of m-chloroperbenzoic acid and 650 mL of methylene chloride.

EXAMPLE 3E

Preparation of bis(α,ω-hydoxybutyl)poly(dimethyl-siloxane-co epoxymethylsiloxane) with 5% epoxymethylsiloxane Units)

The same procedure as described in Example 3A was used with the exception of using 274.6 g of the vinylsiloxane of Example 2A, 58.8 g of m-chloroperbenzoic acid and 600 mL of methylene chloride. The theoretical Mn is about 4543 by H-NMR.

EXAMPLE 3F

Preparation of bis(α,ω-hydoxybutyl)poly(dimethyl-siloxane-co epoxymethylsiloxane) with 5% epoxymethylsiloxane Units)

The same procedure as described in Example 3A was used with the exception of using 340.7 g of the vinylsiloxane of Example 2B, 58.4 g of m-chloroperbenzoic acid and 500 mL of methylene chloride. The theoretical Mn is about 4598 by H-NMR.

EXAMPLE 4

Preparation of Polyurethane-siloxane prepolymer with Four Block Units of epoxymethylsiloxane (10% in PDMS Portion)

A dried 500 mL 3-neck round bottom flask was charged with diethylene glycol (1.065 g, 10.0 mmole), isophorone diisocyanate (4.709 g, 21.2 mmole), dibutyltin dilaurate (0.09 g) and 60 mL of dichloromethane. The reaction mixture was refluxed overnight. The reaction mixture then added to a into 3-Neck, 1 L round bottom flask containing 56.2 g of the epoxy-containing polysiloxane of Example 3A and 130 mL of dichloromethane. The reaction mixture was heated to reflux, and after 60 hrs a reaction sample was removed to determine residual isocyanate. Approximately 16% of isocyanate remained. 4 drops or about 0.009 g of diethylene glycol was added and the isocyanate content was reduced to 7.6%. The reaction mixture was cooled down to about room temperature and HEMA (0.533 g) was added. The isocyanate peak disappeared after about 2 days, and the product recovered after removing the solvent in vacuo.

EXAMPLE 5

Preparation of Polyurethane-siloxane prepolymer with Units of epoxymethylsiloxane (5% in PDMS Portion)

A dried 500 mL 3-neck round bottom flask was charged with 4.76 g of diethylene glycol, 19.93 g of isophorone diisocyanate, 0.58 g of dibutyltin dilaurate and 100 mL of dichloromethane. The reaction mixture was refluxed overnight. The reaction mixture then added to a into 3-Neck, 1 L round bottom flask containing 164.9 g of the epoxy-containing polysiloxane of Example 3E and 500 mL of dichloromethane. The reaction mixture was heated to reflux, and after 48 hrs a reaction sample was removed to determine residual isocyanate. Approximately 11% of isocyanate remained. The reaction mixture was cooled down to about room temperature and 2.95 g of HEMA and 1,1'-2-bi-2-naphthol (19.5 mg) was added. The isocyanate peak disappeared after about 2 days, and the product recovered after removing the solvent in vacuo.

EXAMPLE 6

Preparation of Polyurethane-siloxane prepolymer with Units of epoxymethylsiloxane (5% in PDMS Portion)

The same procedure as described in Example 5 was used with the exception of the amount of ingredients as follows: 4.74 g of diethylene glycol; 19.86 g of isophorone diisocyanate; and 0.577 g of dibutyltin dilaurate. The residual isocyanate was determined by titration to be 47%. The reaction mixture was then added to a reaction flask containing 164.2 g of the epoxymethylsiloxane-polysiloxane of Example 2A and 120 mL of dichloromethane. The reaction mixture was heated to reflux. After 72 hours a sample of the reaction mixture was removed to check the residual isocyanate content (6.1%). The reaction mixture was cooled down to about room temperature and 1.73 g of HEMA and 0.019 g of 1,1'-2-bi-2-naphthol was added. After 2 days, the isocyanate peak disappeared. The product was recovered after stripping off all solvent.

EXAMPLE 7

Preparation of Polyurethane-siloxane prepolymer with Units of vinylmethylsiloxane (5% in PDMS Portion)

A dried 500 mL 3-neck round bottom flask was charged with 1.91 g of diethylene glycol, 7.99 g of isophorone diisocyanate, 0.218 g of dibutyltin dilaurate and 50 mL of dichloromethane. The reaction mixture was refluxed overnight. The residual isocyanate was determined by titration to be 47.6%. The reaction mixture was then added to a reaction flask containing 61.85 g of the vinylmethylsiloxane-polysiloxane of Example 2A and 120 mL of dichloromethane. The reaction mixture was heated to reflux. After 72 hours an aliquot was taken out to check the residual isocyanate (8.9%). The content was cooled down to ambient and HEMA (1.077 g) and 1,1'-bi-2-naphthol (0.0076 g) were added. After 2 days, the isocyanate peak disappeared. The product was recovered after stripping off all solvent.

EXAMPLE 8

Preparation of Polyurethane-siloxane prepolymer with Four Block Units of epoxymethylsilxaone (5% in PDMS Portion, Example 3F)

The same procedure as described in Example 6 was used except that allyl alcohol replaced the HEMA and the amount of ingredients used were as follows: diethylene glycol (0.8586 g, 0.00809 mole), isophorone diisocyanate (3.5938 g, 0.016 mole), dibutyltin dilaurate (0.1035 g), epoxy-containing polysiloxane from Example 3F (29.74 g), allyl alcohol (0.2085 g) and 1,1'-2-bi-2-naphthol (0.0018 g).

EXAMPLE 9

Preparation of Polyurethane-siloxane prepolymer with Five-Block Units of epoxymethylsiloxane (5% in PDMS Portion, Example 3F)

The same procedure as described in Example 6 was used except the amount of ingredients used were as follows: diethylene glycol (0.863 g or 0.0081 mole), isophorone diisocyanate (3.611 g, 0.0162 mole), dibutyltin dilaurate (0.1096 g), epoxy-containing polysiloxane of Example 3F (31.089 g, 0.0675 mole), HEMA (0.445 g) and 1,1'-2-bi-2-naphthol (0.0038 g).

EXAMPLE 10

Preparation of Polyurethane-siloxane prepolymer with Four-Block Units of epoxymethylsiloxane (5% in PDMS Portion of Example 3F)

The same procedure as described in Example 6 except the amount of ingredients used were as follows: diethylene glycol (0.8829 g), isophorone diisocyanate (3.697 g), dibutyltin dilaurate (0.107 g), epoxy-containing polysiloxane of Example 3F (30.61 g), hydroxyethyl acrylate (0.432 g) and 1,1'-2-bi-2-naphthol (0.0045 g).

We claim:
1. A polysiloxane of general formula I:

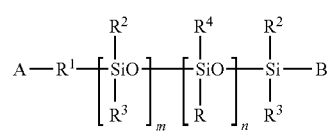

wherein
R is a $C_{2-10}$ alkenyl, a $C_{2-10}$ alkyl with an epoxy group or a $C_5$-$C_7$ cycloalkyl with an epoxy group;
$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;

A is —OH or —NHR$^5$, wherein R$^5$ is hydrogen or a C$_{1-3}$ alkyl; and

B is —R$^1$-A or —R$^6$, wherein R$^1$ is a linking group having an alkylene group with 2 to 8 carbon atoms wherein the alkylene group optionally includes ether, urethane or ureido linkages; and R$^6$ is selected from the group consisting of C$_{1-4}$ alkyl, optionally substituted phenyl and optionally substituted benzyl; and m and n are integers with an m:n ratio from 30:1 to 3:1.

2. The polysiloxane of claim 1 wherein R is a C$_2$-C$_{10}$alkenyl.

3. The polysiloxane of claim 1 wherein R is a C$_{2-10}$alkyl having at least one epoxy group or a C$_5$-C$_6$cycloalkyl having at least one epoxy group.

4. The polysiloxane of claim 1 wherein the m:n ratio is from 20:1 to 8:1, and the polysiloxane has a number average molecular weight from 2000 to 10,000.

5. The polysiloxane of claim 1 wherein A is —OH.

6. The polysiloxane of claim 2 wherein R is selected from the group consisting of —CH=CH$_2$, —CH$_2$—CH=CH$_2$, —CH$_2$—CH$_2$—CH=CH$_2$ —CH$_2$—C$_5$H$_7$ and —CH$_2$—C$_6$H$_9$.

7. The polysiloxane of claim 1 wherein R$^1$ is independently represented by formula S or formula T,

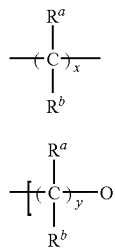

wherein x is any integer from 1 to 6, y is any integer from 2 to 6, and R$^a$ and R$^b$ are each independently selected from hydrogen, fluorine or methyl.

8. The polysiloxane of claim 7 wherein R$^1$ is represented by formula S, x is 3 or 4 and R$^2$, R$^3$ and R$^4$ are independently selected from methyl, ethyl or phenyl.

9. The polysiloxane of claim 3 wherein R is a C$_2$-C$_4$alkylepoxy selected from the group consisting of

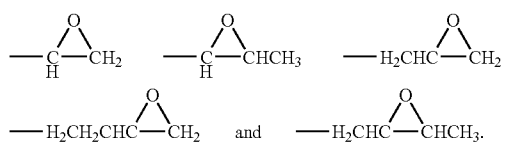

10. A silicone prepolymer of general formula II:

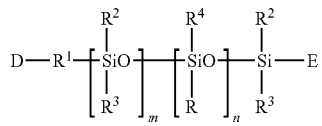

wherein

R is a C$_{2-10}$ alkyl with an epoxy group or a C$_5$-C$_7$cycloalkyl with an epoxy group;

R$^2$, R$^3$ and R$^4$ are each independently selected from the group consisting of hydrogen, C$_{1-4}$ alkyl, C$_{1-4}$ fluoroalkyl, optionally substituted phenyl and optionally substituted benzyl;

m and n are integers with an m:n ratio from 30:1 to 3:1;

R$^1$ is an alkylene group with 2 to 8 carbon atoms wherein the alkylene group optionally includes ether, urethane or ureido linkages;

D is defined by -U-L-M, wherein U is a urethane or urea link, L is an alkylene group with 2 to 8 carbon atoms wherein the alkylene group optionally includes ether, urethane or ureido linkages, and M is an activated polymerizable group; and E is defined by —R$^1$-D or —R$^6$, wherein R$^6$ is selected from the group consisting of C$_{1-4}$ alkyl, optionally substituted phenyl and optionally substituted benzyl.

11. The silicone prepolymer of claim 10 wherein R is a C$_2$-C$_4$alkylepoxy selected from the group consisting of

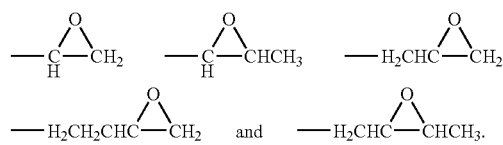

12. The silicone prepolymer of claim 10 wherein E is —R$^1$-D.

13. The silicone prepolymer of claim 10 with a number average molecular weight from 16,000 to 60,000.

14. A silicone prepolymer of general formula IV:

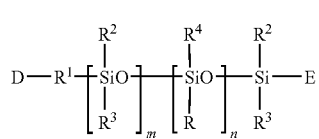

wherein

R is a C$_{2-10}$alkenyl;

R$^2$, R$^3$ and R$^4$ are each independently selected from the group consisting of hydrogen, C$_{1-4}$ alkyl, C$_{1-4}$ fluoroalkyl, optionally substituted phenyl and optionally substituted benzyl;

m and n are integers with an m:n ratio from 30:1 to 3:1;

R$^1$ is an alkylene group with 2 to 8 carbon atoms wherein the alkylene group optionally includes ether, urethane or ureido linkages;

D is defined by -U-L-M, wherein U is a urethane or urea link, L is an alkylene group with 2 to 8 carbon atoms wherein the alkylene group optionally includes ether, urethane or ureido linkages, and M is an activated polymerizable group; and E is defined by —R$^1$-D or —R$^6$, wherein R$^6$ is selected from the group consisting of C$_{1-4}$ alkyl, optionally substituted phenyl or optionally substituted benzyl.

15. The silicone prepolymer of claim 14 wherein R is selected from the group consisting of —CH=CH$_2$, —CH$_2$—CH=CH$_2$, —CH$_2$—CH$_2$—CH=CH$_2$, —CH$_2$—C$_5$H$_7$ and —CH$_2$—C$_6$H$_9$.

16. The silicone prepolymer of claim 14 wherein E is —R$^1$-D.

17. The prepolymer of claim 14 with a number average molecular weight from 16,000 to 60,000.

18. A polysiloxane prepolymer comprising siloxane segments (HS) and (MH)

(*Dii*Diol*Dii*PS)$_x$ (HS)
(*Dii*PS)$_y$ (MH)

wherein:
each Dii is independently a diradical residue of a diisocyanate;
each Diol is independently a diradical residue of a diol having 1 to 10 carbon atoms;
each * is independently —NHC(O)NH—, —NHC(O)O— or —OC(O)NH—;
x represents the number of segments (HS) and is at least 2;
y represents the number of segments (MH) and is at least 1; and
each PS is independently a diradical residue of a polysiloxane of formula

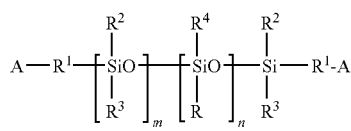

I wherein
R is a $C_{2-10}$ alkenyl, a $C_{2-10}$ alkyl with an epoxy group or a $C_5$-$C_7$cycloalkyl with an epoxy group;
$R^1$ is a linking group having an alkylene group with 2 to 8 carbon atoms wherein the alkylene group optionally includes ether, urethane or ureido linkages;
$R^2$, $R^3$ and $R^4$ are each independently selected from the group consisting of hydrogen, $C_{1-4}$ alkyl, $C_{1-4}$ fluoroalkyl, optionally substituted phenyl and optionally substituted benzyl;
A is —OH or —NHR$^5$, wherein $R^5$ is hydrogen or a $C_{1-3}$ alkyl; and
m and n are integers with an m:n ratio from 30:1 to 3:1.

19. The polysiloxane prepolymer of claim 18 wherein $R^1$ is independently represented by formula S or formula T,

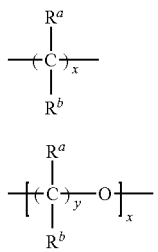

x is any integer from 1 to 6, y is any integer from 2 to 6, and $R^a$ and $R^b$ are each independently selected from hydrogen, fluorine or methyl.

20. The polysiloxane prepolymer of claim 19 wherein $R^1$ is represented by formula S, x is 3 or 4 and $R^2$, $R^3$ and $R^4$ are independently selected from methyl, ethyl or phenyl.

* * * * *